US008925305B2

(12) United States Patent
Shinoda et al.

(10) Patent No.: US 8,925,305 B2
(45) Date of Patent: Jan. 6, 2015

(54) EXHAUST DEVICE FOR AN INTERNAL COMBUSTION ENGINE

(75) Inventors: Yoshihisa Shinoda, Susono (JP); Koichi Hoshi, Susono (JP); Keisuke Sano, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 71 days.

(21) Appl. No.: 13/583,555

(22) PCT Filed: Mar. 12, 2010

(86) PCT No.: PCT/JP2010/054182
§ 371 (c)(1),
(2), (4) Date: Sep. 7, 2012

(87) PCT Pub. No.: WO2011/111217
PCT Pub. Date: Sep. 15, 2011

(65) Prior Publication Data
US 2013/0042599 A1     Feb. 21, 2013

(51) Int. Cl.
| F01N 3/18 | (2006.01) |
| F02D 19/08 | (2006.01) |
| F01N 3/08 | (2006.01) |
| F02D 19/06 | (2006.01) |
| F01N 3/20 | (2006.01) |
| F02B 43/10 | (2006.01) |

(52) U.S. Cl.
CPC ............ *F01N 3/2073* (2013.01); *F02D 19/081* (2013.01); *F02B 2043/103* (2013.01); *F01N 3/0814* (2013.01); *F02D 19/0615* (2013.01); *F01N 2240/30* (2013.01); *F01N 3/0842* (2013.01); *F02B 43/10* (2013.01); *Y02T 10/36* (2013.01); *B01D 2258/018* (2013.01); *F02D 19/0671* (2013.01); *F01N 2410/00* (2013.01); *F02D 19/0647* (2013.01)
USPC .......................................... 60/286

(58) Field of Classification Search
USPC ............ 60/285, 286, 300, 301, 303; 123/575, 123/576, 578
See application file for complete search history.

(56) References Cited

U.S. PATENT DOCUMENTS

2005/0223699 A1   10/2005   Ancimer et al.

FOREIGN PATENT DOCUMENTS

| DE | 102006025259 A1 | 12/2007 |
| JP | 2000-186532 A | 7/2000 |
| JP | 2004-270604 A | 9/2004 |
| JP | 2005-030243 A | 2/2005 |
| JP | 2006-502345 A | 1/2006 |
| JP | 2006-226218 A | 8/2006 |
| JP | 2008-169704 A | 7/2008 |
| WO | 2007137642 A1 | 12/2007 |

*Primary Examiner* — Thomas Denion
*Assistant Examiner* — Jonathan Matthias
(74) *Attorney, Agent, or Firm* — Sughrue Mion, PLLC

(57) ABSTRACT

An exhaust device for an internal combustion engine is mounted on a vehicle and equipped with an exhaust passage, a reforming catalyst and a NOx purification catalyst. The exhaust passage communicates with the engine. The reforming catalyst is provided on the exhaust passage at the upstream side of the NOx purification catalyst, and it generates the reducing agent by reforming $CH_4$. The NOx purification catalyst purifies NOx by means of the reducing agent generated by the reforming catalyst.

4 Claims, 9 Drawing Sheets

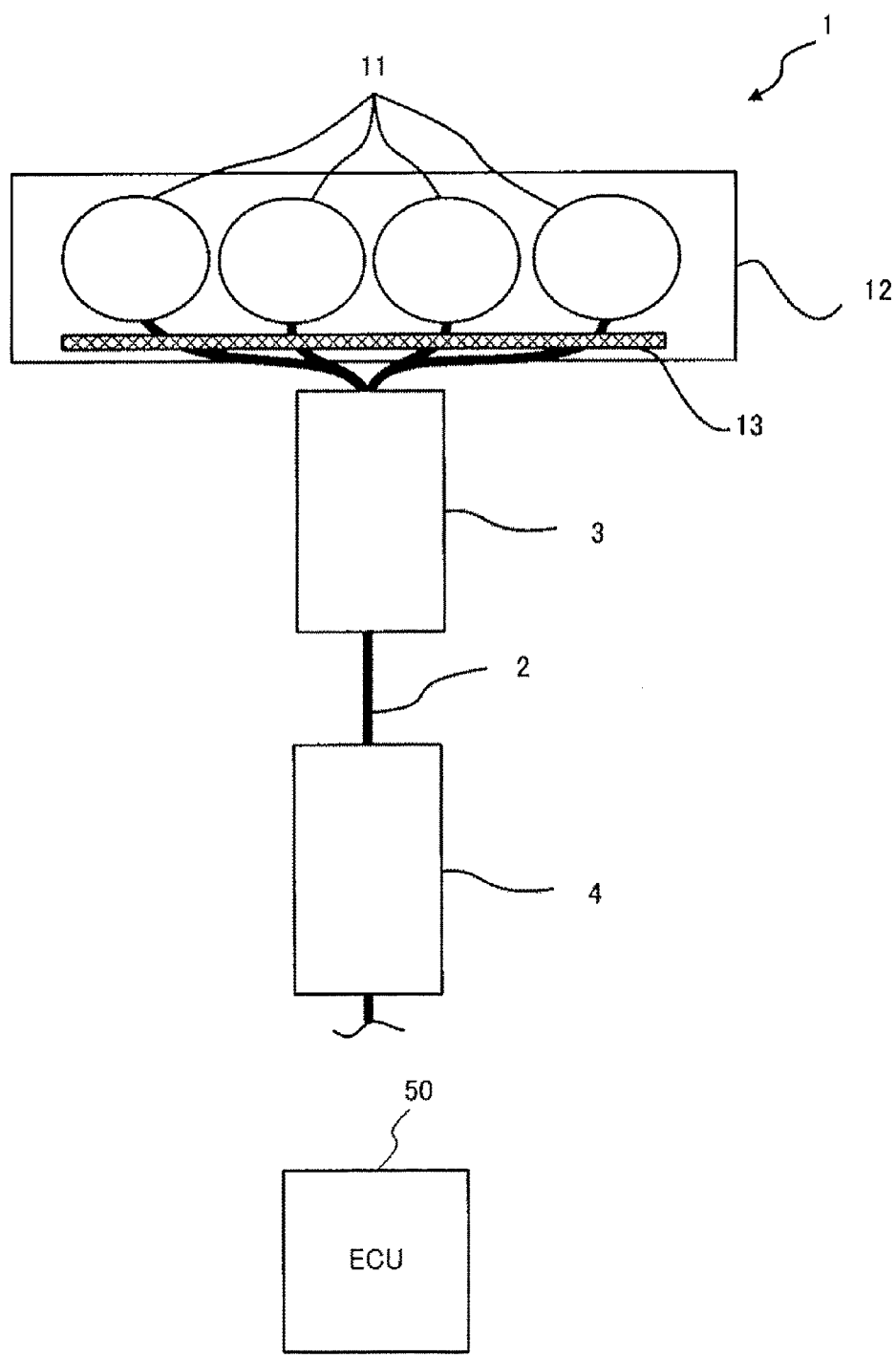

FIG. 4
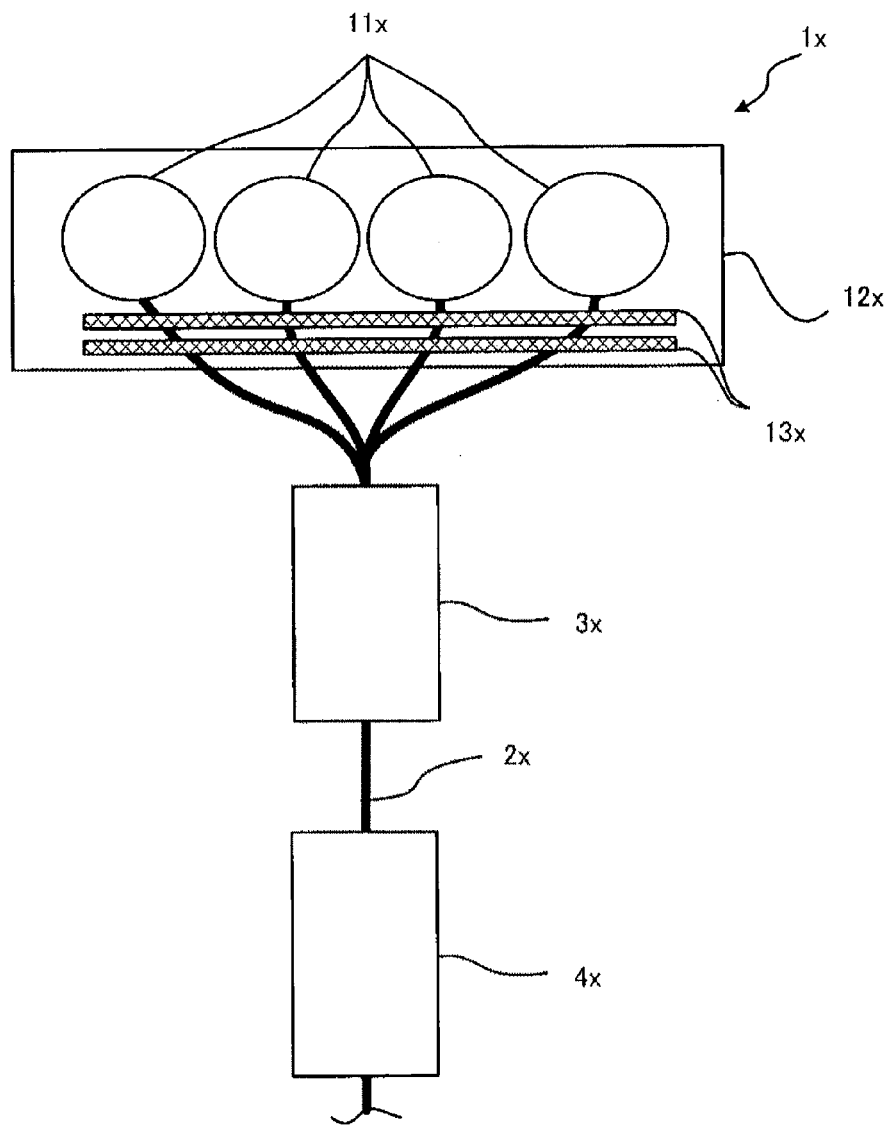
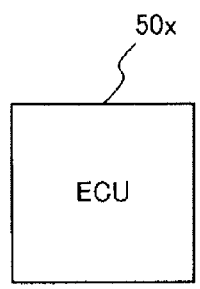

EXHAUST DEVICE FOR AN INTERNAL COMBUSTION ENGINE

CROSS REFERNCE TO RELATED APPLICATIONS

This application is a National Stage of International Application No. PCT/JP2010/054182 filed Mar. 12, 2010, the contents of all of which are incorporated herein by reference in their entirety.

TECHNICAL FIELD

The present invention relates to a technique of purifying exhaust gas of an internal combustion engine (an engine).

BACKGROUND TECHNIQUE

Conventionally, there is known a technique of reforming natural gas and water vapor in a catalyst. For example, in Patent Reference-1, there is disclosed a technique of making methane ($CH_4$) react with water vapor ($H_2O$) and converting them into the reformed fuel consisting of carbon monoxide (CO) and hydrogen ($H_2$). In Patent Reference-2, there is disclosed a technique of supplying the engine with gas fuel in a case where the temperature of the engine at the time of the start thereof is lower than a predetermined threshold.

Patent Reference-1: Japanese Patent Application Laid-open under No. 2005-030243

Patent Reference-2: Japanese Patent Application Laid-open under No. 2008-169704

DISCLOSURE OF INVENTION

Problem to be Solved by the Invention

By use of the technique disclosed in Patent Reference-1, $CH_4$ can be converted into the reformed fuel. However, in case of Patent Reference-1, it is necessary to supplyvapor water in addition. Patent Refernce-1 neither discloses nor suggests an issue of reducing the emission by reforming $CH_4$.

The present invention has been achieved in order to solve the above problem. It is an object of this invention to provide an exhaust device for an internal combustion engine capable of reducing the emission by reforming $CH_4$.

Means for Solving the Problem

According to one aspect of the present invention, there is provided an exhaust device for an internal combustion engine, comprising: an exhaust passage communicating with an engine; a reforming catalyst provided on the exhaust passage, the reforming catalyst generating a reducing agent by reforming $CH_4$; and a NOx purification catalyst provided on the exhaust passage at a downstream side of the reforming catalyst, the NOx purification catalyst purifying NOx by means of the reducing agent.

The above exhaust device for an internal combustion engine is mounted on a vehicle and equipped with an exhaust passage, a reforming catalyst and a NOx purification catalyst. The exhaust passage communicates with the engine. The reforming catalyst is provided on the exhaust passage at the upstream side of the NOx purification catalyst, and it generates the reducing agent by reforming $CH_4$. The NOx purification catalyst purifies NOx by means of the reducing agent generated by the reforming catalyst. In such a configuration, the exhaust device for an internal combustion engine reduces $CH_4$ in the exhaust gas and reduces NOx by means of a reducing agent generated by reforming $CH_4$. Thus, the exhaust device for an internal combustion engine can reduce the emission.

In a manner of the exhaust device for an internal combustion engine, the engine uses CNG (Compressed Natural Gas) as fuel. Generally, when CNG is used as fuel, little emission such as carbon dioxide ($CO_2$) and black smoke is discharged. In contrast, in this case, amount of $CH_4$ emission is relatively increased. Thus, in this manner, the exhaust device for an internal combustion engine can reduce much emission compared to other kinds of fuel because it can generate a reducing agent from $CH_4$ discharged by the engine thereby to purify NOx.

In another manner of the exhaust device for an internal combustion engine, the engine can be driven by switching multiple kinds of fuel including CNG, and the exhaust device for an internal combustion engine further comprises a control unit which supplies the CNG to the engine provided that the reforming catalyst has a temperature equal to or higher than a predetermined value. In this manner, the exhaust device for an internal combustion engine further includes a control unit. The engine is a bifuel engine which can be driven by switching multiple kinds of fuel including CNG. The control unit is an ECU (Electronic Control Unit) for example, and supplies the CNG to the engine if the reforming catalyst has a temperature equal to or higher than a predetermined value. Generally, when the temperature of the reforming catalyst is low, the conversion rate of reforming $CH_4$ by means of reforming catalyst becomes low. Thus, in this manner, the exhaust device for an internal combustion engine can reduce the emission by performing the CNG operation only when $CH_4$ can be reformed.

In still another manner of the exhaust device for an internal combustion engine, the reforming catalyst generates the reducing agent by reforming $CH_4$ and $H_2O$, and the predetermined value is determined based on $CH_4$ density and $H_2O$ density of gas discharged from the engine. In this manner, the reforming catalyst reforms $CH_4$ and $H_2O$. In the meantime, a target value of the conversion rate of reforming $CH_4$ and $H_2O$ depends on the $CH_4$ density and the $H_2O$ density in the exhaust gas supplied from the engine. Thus, in this manner, by determining the above-mentioned predetermined value based on the $CH_4$ density and the $H_2O$ density, the exhaust device for an internal combustion engine can expand the operating range capable of using CNG thereby to reduce the emission.

In still another manner of the exhaust device for an internal combustion engine, the reforming catalyst generates the reducing agent by reforming CH4 and H2O, and in case of supplying CNG to the engine, the control unit additionally supplies the engine with fuel having a higher ratio of the $H_2O$ density to the $CH_4$ density contained in exhaust gas compared to the CNG, and lets the engine combust the fuel. An example of "fuel having a higher ratio of the $H_2O$ density to the $CH_4$ density contained in exhaust gas compared to the CNG" is fuel containing ethanol. In this way, by additionally supplying the fuel, which has a high ratio of $H_2O$ after the combustion in the engine, at the time of using CNG, the exhaust device for an internal combustion engine can increase water vapor supplied to the reforming catalyst thereby to accelerate the reforming reaction in the reforming catalyst. Thus, the exhaust device for an internal combustion engine can increase the conversion rate of $CH_4$ in the exhaust gas.

In still another manner of the exhaust device for an internal combustion engine, the exhaust device for an internal combustion engine comprises an air fuel ratio sensor, and the reforming catalyst generates the reforming agent by reforming $CH_4$ and $H_2O$, and the air fuel ratio sensor is provided on the exhaust passage at the downstream side of the reforming catalyst. The reforming catalyst reforms $H_2O$ in addition to $CH_4$. The air fuel ratio sensor has a possibility of deterioration of elements thereof because of water vapor poured over the sensor. Since the air fuel ratio sensor is provided at the downstream side of the reforming catalyst, the exhaust device for an internal combustion engine can prevent the air fuel ratio sensor from contacting the water thereby to certainly suppress damage of the air fuel ratio sensor.

BRIEF DESCRIPTION OF THE DRAWINGS

FIG. 1 is an example of a schematic configuration of an exhaust device for an internal combustion engine according to the first embodiment.

FIG. 4 is a schematic configuration of the exhaust device for an internal combustion engine according to the comparative example.

DETAILED DESCRIPTION OF THE PREFERRED EMBODIMENTS

Figure 2A:
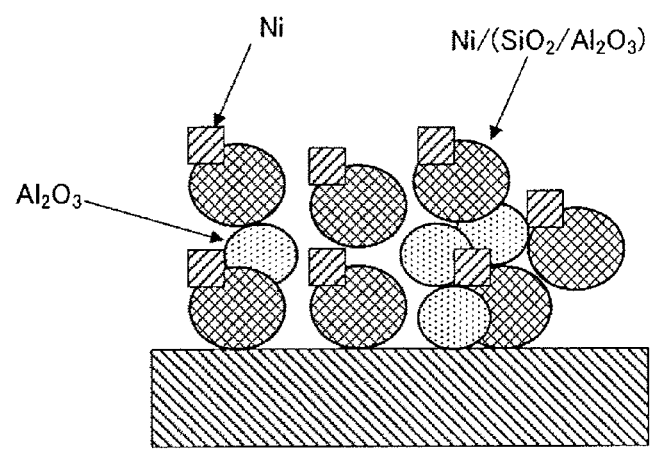
FIGS. 2A and 2B indicate each configuration of a front catalyst and a rear catalyst.

Preferred embodiments of the present invention will be explained in the first embodiment to the third embodiment hereinafter with reference to the drawings.

[First Embodiment]
(Schematic Configuration)

FIG. 1 shows a schematic configuration of an exhaust device 100 for an internal combustion engine according to the present invention.

The exhaust device 100 for an internal combustion engine mainly includes an engine 1, an exhaust passage 2, a front catalyst 3, a rear catalyst 4 and an ECU 50.

The engine 1 includes four cylinders 11, and generates driving power by combusting mixed gas of supplied fuel and air. By an unshown fuel injection valve supplying CNG and an unshown fuel injection valve supplying liquid fuel, each cylinder 11 is supplied with each kind of fuel. The liquid fuel may be gasoline, light oil, alcohol such as methanol and ethanol, and mixed fuel of them, for example. It is noted that each of the CNG and the liquid fuel is stored in each fuel tank not shown.

The engine 1 is also equipped with a water jacket 13 functioning as a passage of cooling water for cooling the cylinders 11 and the cylinder head 12. In the embodiment, the water jacket 13 has a reduced wetted-area on the surfaces of the exhaust port and the exhaust manifold (hereinafter simply referred to as "exhaust system") which the exhaust gas passes through. In other words, the water jacket 13 is designed so that the heat capacity of the exhaust system is reduced. Thereby, the exhaust device 100 for an internal combustion engine prevents the condensation of water vapor in the exhaust system.

The exhaust gas generated in each cylinder 11 passes through the exhaust passage 2 via the exhaust port and the exhaust manifold. On the exhaust passage 2, there are provided the front catalyst 3 arranged at just behind the exhaust manifold and the rear catalyst 4 for purifying NOx. The front catalyst 3 is a reforming catalyst of methane ($CH_4$) and water vapor ($H_2O$).

Here, a detailed description will be given of the front catalyst 3 and the rear catalyst 4 with reference to FIGS. 2A and 2B. FIG. 2A is one example showing the configuration of the front catalyst 3. As shown in FIG. 2A, the front catalyst 3 includes particles and aluminum oxide ($Al_2O_3$). The particles are adsorbents having a high capacity to absorb $CH_4$, which is a main component of CNG, mixed at a predetermined rate with nickel (Ni) having a high capacity to reform $CH_4$. The above-mentioned adsorbents are mixtures of silicon dioxide ($SiO_2$) and $Al_2O_3$ at a predetermined rate. Thereby, the front catalyst 3 absorbs $CH_4$ and reforms $CH_4$ with water vapor to purify it. Namely, the front catalyst 3 purifies $CH_4$ by generating a reaction according to the following reaction formula (1).

$$CH_4 + H_2O \rightarrow CO + 3H_2 \qquad (1)$$

The front catalyst 3 also has a partial oxidation reaction with oxygen ($O_2$). Namely, in addition to the reaction according to the reaction formula (1), the front catalyst 3 generates a reaction shown in the following reaction formula (2).

$$CH_4 + \tfrac{1}{2}O_2 \rightarrow CO + 2H_2 \qquad (2)$$

As shown in the reaction formulas (1) and (2), through the reactions according to the formulas (1) and (2), the front catalyst 3 generates carbon monoxide (CO) and hydrogen ($H_2$), which function as reducing agents of the rear catalyst 4. In this way, CO and $H_2$ are examples of "reducing agent" according to the present invention. Thereby, as described below, the exhaust device 100 for an internal combustion engine can reform $CH_4$ and reduce the emission. By reforming water vapor in addition to $CH_4$, the exhaust device 100 for an internal combustion engine can also reduce the density of water vapor in the exhaust gas after passing through the front catalyst 3.

Preferably, the front catalyst 3 is an electrically heated catalyst (EHC) equipped with a heater, and it is warmed up under the control of the ECU 50.

Instead of Ni, the front catalyst 3 may include rhodium (Rh), ruthenium (Ru), platinum (Pt) and other metal having a catalyst activity to the reform of $CH_4$ and water vapor.

Figure 2B:
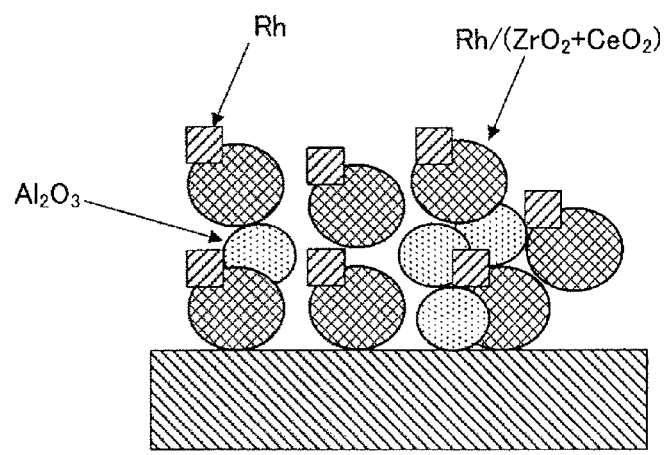

FIG. 2B is one example showing the configuration of the rear catalyst 4. As shown in FIG. 2B, the rear catalyst 4 includes particles and $Al_2O_3$. The particles are adsorbents ($ZrO_2 + CeO_2$) having high capacity to absorb NOx equipped with Rh having a high ability to reduce NOx. Thereby, the rear catalyst 4 absorbs NOx and reduces NOx to purify it. At that time, the rear catalyst 4 makes CO and $H_2$ generated in the front catalyst 3 function as reducing agents of carbon monoxide (NO). In other words, the rear catalyst 4 generates reactions according to the following reaction formulas (3) and (4).

$$NO + H_2 \rightarrow \tfrac{1}{2}N_2 + H_2O \qquad (3)$$

$$2NO + CO \rightarrow \tfrac{1}{2}N_2 + CO_2 \qquad (4)$$

As shown in the reaction formulas (3) and (4), by making CO and $H_2$ generated in the front catalyst 3 function as the reducing agents, the rear catalyst 4 purifies NOx thereby to reduce the emission.

Next, the configuration of the exhaust device 100 for an internal combustion engine will be described with reference to FIG. 1 again. The ECU 50 includes a CPU (Central Processing Unit), a ROM (Read Only Memory) and a RAM (Random Access Memory), which are not shown, and executes various control of each component in the exhaust device 100 for an internal combustion engine. For example, the ECU 50 executes the control of injecting the liquid fuel and the CNG on the basis of detection signals supplied as described above. Then, the ECU 50 functions as a control unit in the present invention.

The term "CNG operation" herein indicates operation by use of CNG, and the term "liquid fuel operation" herein indicates operation by use of liquid fuel.

(Control Method)

Next, a detailed description will be given of the control executed by the ECU 50. In summary, when the temperature of the front catalyst 3 (hereinafter referred to as "catalyst temperature T") is lower than a predetermined temperature (hereinafter referred to as "threshold T1"), the ECU 50 does not perform the CNG operation until the catalyst temperature T becomes equal to or higher than the threshold T1. Thereby, the ECU 50 accelerates the reforming reaction according to the reaction formula (1) and achieves high reducing efficiency of the $CH_4$ and reduction of the density of the water vapor after passing through the front catalyst 3.

The supplemental description thereof will be given with reference to FIG. 3. Hereinafter, the term "$CH_4$ conversion rate" indicates a rate of $CH_4$ reformed in the front catalyst 3 to $CH_4$ contained in the exhaust gas discharged from the engine 1. The term "$H_2O$ conversion rate" indicates a rate of $H_2O$ reformed in the front catalyst 3 to $H_2O$ contained in the exhaust gas discharged from the engine 1. The term "$CH_4$ density" indicates the density of $CH_4$ contained in the exhaust gas, and the term "$H_2O$ density" indicates the density of $H_2O$ contained in the exhaust gas.

Figure 3:
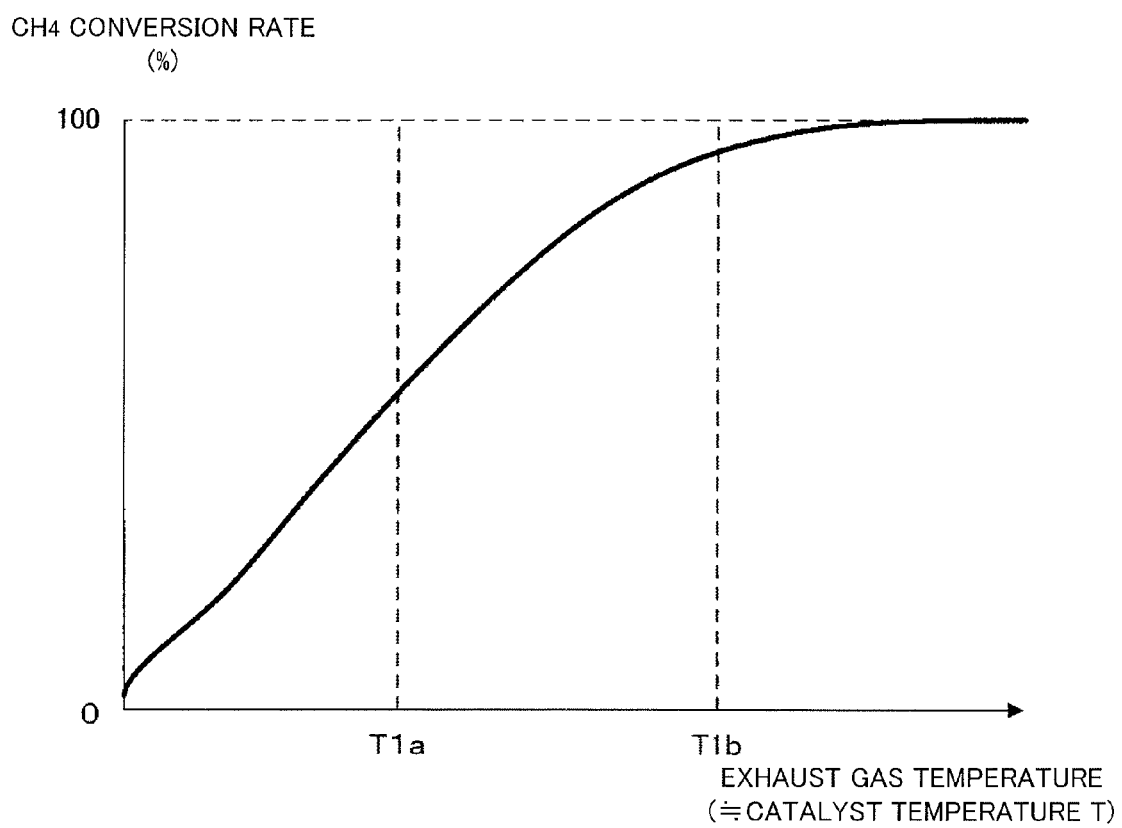
FIG. 3 shows an example of a graph indicating the relationship between the $CH_4$ conversion rate and the exhaust gas temperature.

FIG. 3 shows an example of a map indicating the relationship between the $CH_4$ conversion rate and the exhaust gas temperature substantially equivalent to the catalyst temperature T. As shown in FIG. 3, the higher the exhaust gas temperature substantially equivalent to the catalyst temperature T is, the more the reaction according to the reaction formula (1) is accelerated and the higher the $CH_4$ conversion rate becomes. Similarly, the higher the exhaust gas temperature is, the higher the $H_2O$ conversion rate becomes as a result of the acceleration of the reaction according to the reaction formula (1). Thus, by performing the CNG operation after the warming-up of the front catalyst 3, the ECU 50 can reduce the $CH_4$ density and the $H_2O$ density after passing through the front catalyst 3. By performing the CNG operation after the warming-up of the front catalyst 3, the ECU 50 can also supply the rear catalyst 4 with $H_2$ and CO functioning as reducing agents as shown in the reaction formula (1) and the reaction formula (2). Thus, by performing the CNG operation after the warming-up of the front catalyst 3, the ECU 50 can accelerate the reaction according to the reaction formulas (3) and (4) thereby to reduce the emission as a result of the purification of NOx.

Next, the detailed description will be given of the determination process of the threshold T1. The ECU 50 determines the threshold T1 on the basis of the $CH_4$ density and $H_2O$ density in the exhaust gas before passing through the front catalyst 3. Concretely, for example, based on the fuel injection quantity and the state of the engine 1, the ECU 50 estimates the $CH_4$ density and the $H_2O$ density before passing through the front catalyst 3 on the assumption of starting the CNG operation. Then, on the basis of the $CH_4$ density and the $H_2O$ density, the ECU 50 sets the threshold T1 with reference to a map or an equation, for example. The above-mentioned map or the equation is prepared in advance based on experimental trials, and stored in the memory of the ECU 50.

Preferably, in the above case, the higher the $CH_4$ density and the $H_2O$ density before passing through the front catalyst 3 are, the higher the ECU 50 sets the threshold T1. For example, when the $CH_4$ density and the $H_2O$ density before passing through the front catalyst 3 are high, the ECU 50 sets the threshold T1 to the temperature "T1$b$" shown in FIG. 3. Namely, in this case, considering the high $CH_4$ density and the high $H_2O$ density before passing through the front catalyst 3, the ECU 50 sets the threshold T1 to the temperature T1b corresponding to the high $CH_4$ conversion rate and the high $H_2O$ conversion rate in order to prevent the $CH_4$ density and the $H_2O$ density after the front catalyst 3 from exceeding a predetermined target value.

In contrast, when the $CH_4$ density and the $H_2O$ density before passing through the front catalyst 3 are predetermined values lower than the values in the above example, the ECU 50 sets the threshold T1 to the temperature "T1$a$" lower than the temperature T1$b$. Namely, considering the low $CH_4$ density and the low $H_2O$ density before passing through the front catalyst 3, the ECU 50 determines that it does not have to raise the $CH_4$ conversion rate and the $H_2O$ conversion rate up to the $CH_4$ conversion rate and the $H_2O$ conversion rate corresponding to the temperature T1$b$. In other words, considering the fact that the $CH_4$ density and the $H_2O$ density before passing through the front catalyst 3 are already low, the ECU 50 determines that it can prevent the $CH_4$ density and the $H_2O$ density after passing through the front catalyst 3 from exceeding the predetermined target value if the threshold T1 is set to temperature equal to or higher than the temperature T1$a$. Thus, in this case, the ECU 50 sets the threshold T1 to the temperature T1$a$ at which the $CH_4$ conversion rate and the $H_2O$ conversion rate are lower than those in case of the temperature T1$b$. In such a way, provided that the $CH_4$ density and the $H_2O$ density before the front catalyst 3 are low, the ECU 50 can start the CNG operation even if the catalyst temperature T is relatively low.

By determining the threshold T1 based on the $CH_4$ density and the $H_2O$ density as described above, the ECU 50 can reduce the duration of restricting the CNG operation to the minimum while reducing the emission.

Next, a concrete example in case of inhibiting the CNG operation will be described below. In the first example, if the catalyst temperature T is lower than the threshold T1 at the time of a request for the start of the engine 1 by the CNG operation, the ECU 50 does not execute the CNG operation and lets the heater heat the front catalyst 3 until the catalyst temperature T becomes equal to or higher than the threshold T1. Then, when the catalyst temperature T becomes equal to or higher than the threshold T1, the ECU 50 lets the engine 1 start by the CNG operation. In such a way, the ECU 50 accelerates the reaction according to the reaction formula (1) in the front catalyst 3 at the time of the CNG operation thereby to improve the conversion efficiency of the $CH_4$, and it can also accelerate the purification of NOx in the rear catalyst 4. At the same time, by reducing the $H_2O$ density after passing through the front catalyst 3, the ECU 50 can reduce the condensate water generation at the downstream side of the front catalyst 3 in the exhaust passage 2 thereby to prevent deterioration or damage of sensors due to water poured over them.

In the second example, if the catalyst temperature T is lower than the threshold T1 at the time of a request for switching the liquid fuel operation to the CNG operation, the ECU 50 does not execute the switching to the CNG operation until the catalyst temperature T becomes equal to or higher than the threshold T1. Then, the ECU 50 performs the CNG operation when the catalyst temperature T is equal to or higher than the threshold T1. In such a way, the ECU 50 can reduce the $CH_4$ density in the exhaust gas and the $H_2O$ density after passing through the front catalyst 3.

(Effect)

Next, the effect of the first embodiment will be described below.

Generally, when the $H_2O$ density before passing through the front catalyst 3 is low, the reaction according to the reaction formula (1) is unlikely to occur. Thus, under conditions where the condensation of water vapor occurs in the exhaust port and the exhaust manifold, the reaction according to the reaction formula (1) is unlikely to occur due to the low $H_2O$ density in the front catalyst 3. For example, a condition of the condensation of water vapor is that the wall surface of the exhaust port has temperature equal to or lower than the dew point. In contrast, when the air fuel ratio is controlled toward the rich side by increasing the fuel quantity for the purpose of the high $H_2O$ density before passing through the front catalyst 3, the $CH_4$ is also increased.

In light of the above-mentioned facts, in the first embodiment, the ECU 50 performs the CNG operation when the catalyst temperature T is equal to or higher than the threshold T1. Thereby, the ECU 50 can accelerate reaction according to the reaction formula (1) without separately supplying the water vapor to the front catalyst 3 and it can reduce the $CH_4$ density and the $H_2O$ density after passing through the front catalyst 3.

The exhaust device 100 for an internal combustion engine according to the first embodiment also has the rear catalyst 4 which is a NOx purification catalyst at the downstream of the front catalyst 3. In such a configuration, the exhaust device 100 for an internal combustion engine can accelerate the purification of NOx in the rear catalyst 4 by means of $H_2$ and CO generated at the reactions according to the reaction formulas (1) and (2). In other words, by accelerating the reforming reaction according to the reaction formula (1), the ECU 50 can increase enough reducing agents for the reaction at the rear catalyst 4 thereby to accelerate the purification of NOx.

In addition, the exhaust device 100 for an internal combustion engine according to the first embodiment is designed to have less cooling area of the water jacket 13 for cooling the exhaust port and/or the exhaust manifold. The description thereof will be given with reference to the comparative example shown in FIG. 4. FIG. 4 is a schematic configuration of the exhaust device 100x for an internal combustion engine according to the comparative example. The exhaust device 100x for an internal combustion engine mainly includes an engine 1x, an exhaust passage 2x, a front catalyst 3x, a rear catalyst 4x and an ECU 50x.

As shown in FIG. 4, compared to the first embodiment shown in FIG. 1, the water jacket 13x according to the comparative example has a larger contact area with the exhaust system, ranging from each cylinder 11x to the exhaust passage 2x, for cooling the exhaust system. In other words, compared to the exhaust device 100x for an internal combustion engine according to the comparative example, the exhaust device 100 for an internal combustion engine according to the first embodiment has a lower capacity of cooling the exhaust system by means of the water jacket 13x. Thus, compared to the comparative example, the exhaust device 100 for an internal combustion engine according to the first embodiment can reduce the heat capacity of the exhaust system and can prevent the condensation of water vapor in the exhaust system.

(Process Flow)

Next, a procedure of the process according to the first embodiment will be described with reference to FIGS. 5 and 6. First, a description of the control of the engine 1 at the time of the start of the operation will be given before a description of the control at the time of switching the liquid fuel operation to the CNG operation will be given.

1. Control at Start of Operation

Figure 5:
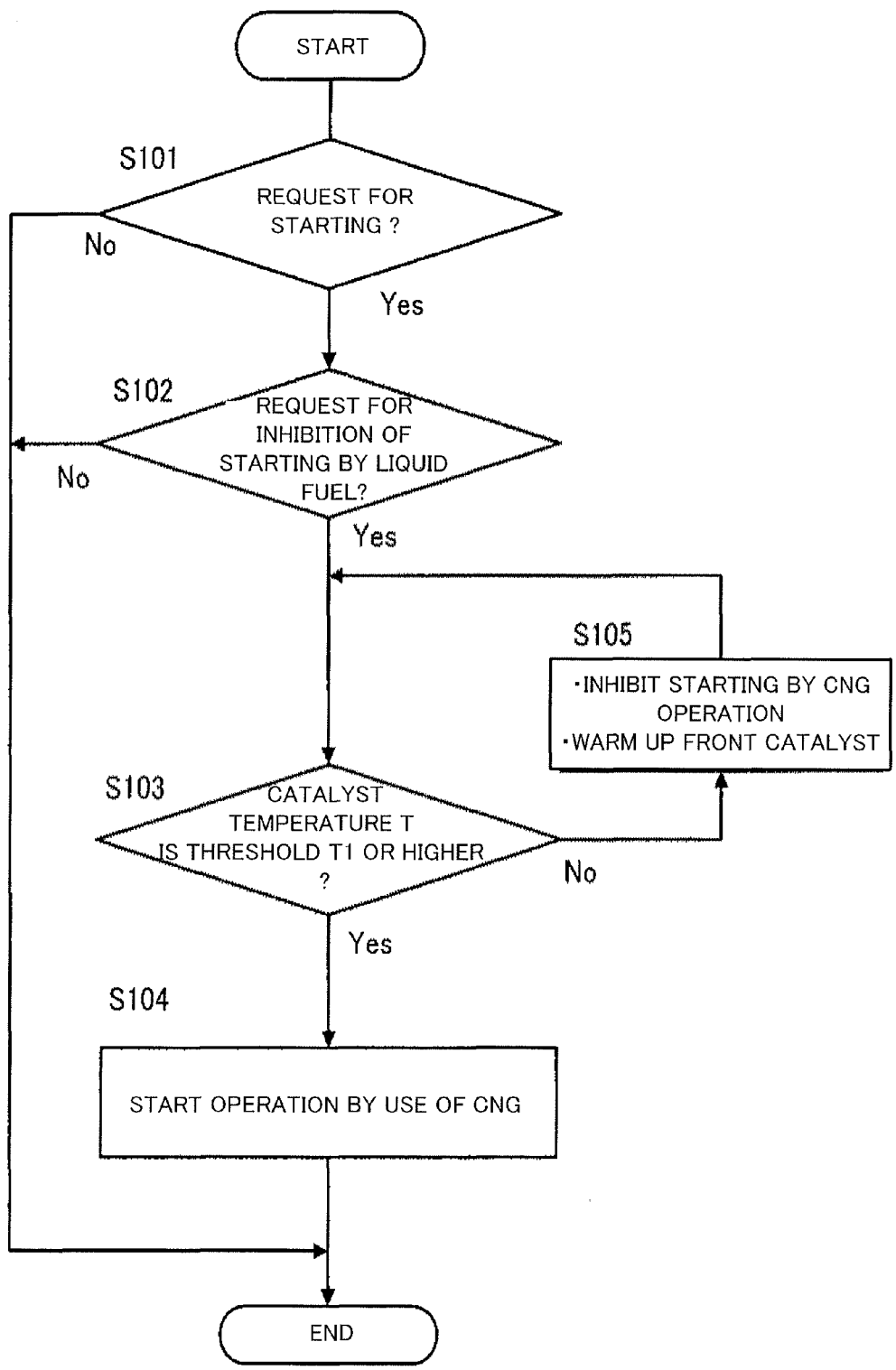
FIG. 5 is an example of a flowchart showing the procedure of the process according to the first embodiment at the start of the operation of the engine.

FIG. 5 is an example of a flowchart showing the procedure of the process according to the first embodiment at the time of the start of the operation of the engine 1. The flowchart shown in FIG. 5 is repeatedly executed by the ECU 50 in a predetermined cycle.

First, the ECU 50 determines whether or not the starting of the engine 1 is requested (step S101). When the ECU 50 determines that the starting of the engine 1 is requested (step S101; Yes), it also determines whether or not the inhibition of the starting by use of the liquid fuel is requested (step S102). When the ECU 50 determines that the inhibition of the starting by use of the liquid fuel is requested (step S102; Yes), it executes the process at step S103 to step S105.

On the other hand, when the ECU 50 determines that the starting the engine 1 is not requested (step S101; No) or when it determines that the inhibition of the starting by use of the liquid fuel is not requested (step S102; No), it ends the process of the flowchart. Concretely, when the ECU 50 determines that the inhibition of the starting by use of the liquid fuel is not requested (step S102; No), it executes the control of the fuel injection by use of liquid fuel thereby to start the engine 1.

Next, at step S103, the ECU 50 determines whether or not the catalyst temperature T is equal to or higher than the threshold T1 (step S103). For example, the ECU 50 may estimate the catalyst temperature T based on a detection value supplied from the temperature sensor (not shown) provided on the exhaust passage 2, or it may monitor a detection value supplied from the temperature sensor provided on the front catalyst 3 and regard it as the catalyst temperature T. The ECU 50 also estimates the $H_2O$ density and the $CH_4$ density on the assumption of performing the CNG operation, and it determines the threshold T1 with reference to a prepared map.

When the ECU 50 determines that the catalyst temperature T is equal to or higher than the T1 (step S103; Yes), it starts the CNG operation (step 104). Namely, in this case, in consideration of the catalyst temperature T, the $CH_4$ density and $H_2O$ density, the ECU 50 determines that the $CH_4$ density and the $H_2O$ density after passing through the front catalyst 3 can be suppressed to the target value at most. In this case, by starting the operation by use of CNG, the ECU 50 can reduce the $CH_4$ density and the $H_2O$ density after passing through the front catalyst 3 while letting the $H_2$ and CO generated in the front catalyst 3 function as reducing agents thereby to purify NOx in the rear catalyst 4. As a result, the ECU 50 can achieve low emission.

On the other hand, when the ECU 50 determines that the catalyst temperature T is not equal to nor higher than the threshold T1 (step S103; No), i.e., when it determines that the catalyst temperature T is lower than the threshold T1, it inhibits the starting of the operation by use of CNG and warms up the front catalyst 3 (step S105). For example, the ECU 50 makes a heater provided on the front catalyst 3 warm up the front catalyst 3. Then, the ECU 50 continues to execute the process at step S105 until the catalyst temperature T becomes equal to or higher than the threshold T1. Thereby, the ECU 50 suppresses the deterioration of the emission due to residual $CH_4$ while suppressing the damage of sensors due to the condensation of water vapor.

2. Control of Switching to CNG Operation.

Figure 6:
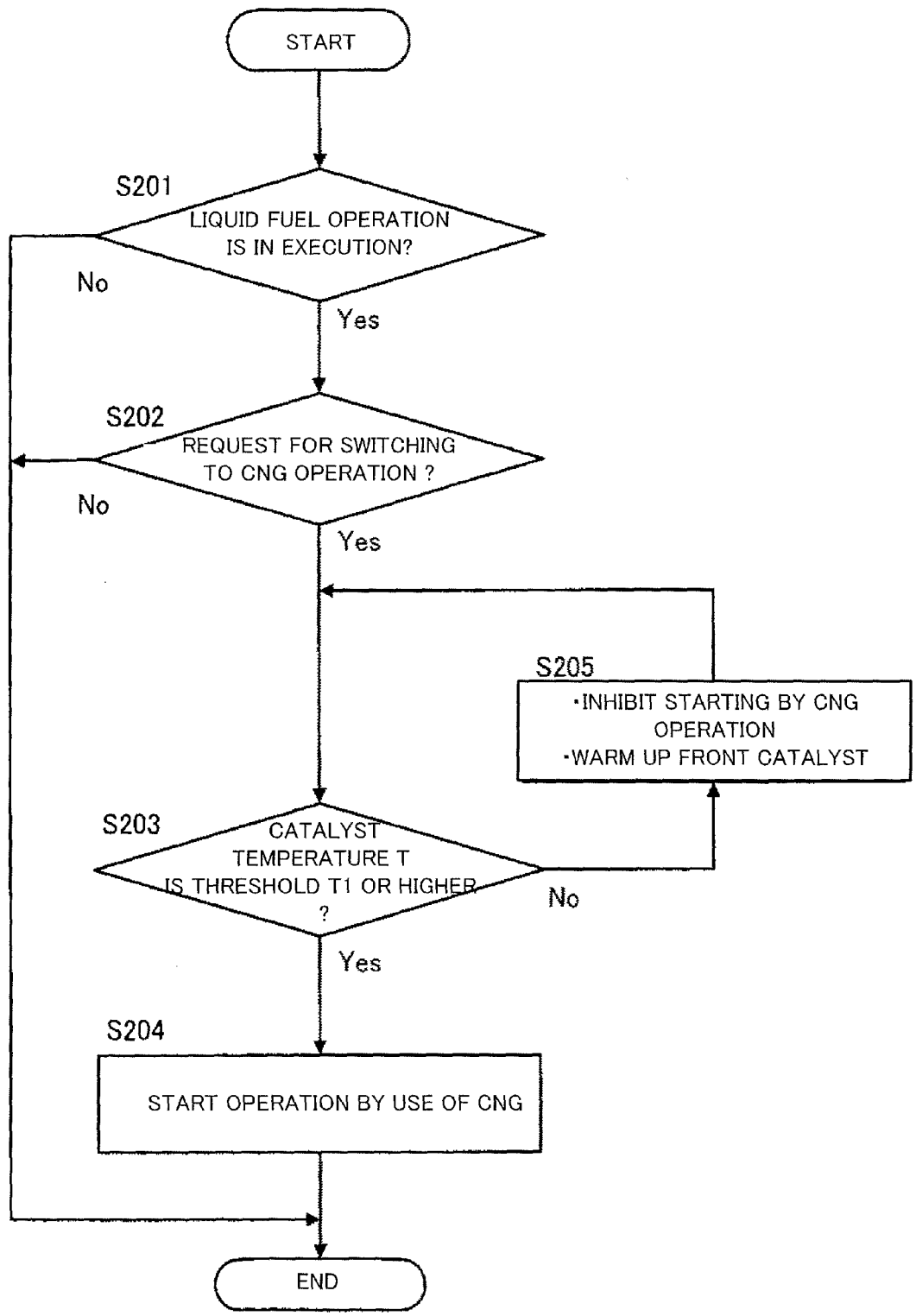
FIG. 6 is one example of a flowchart indicating a procedure of the process at the time of switching to the CNG operation according to the first embodiment.

FIG. 6 is one example of a flowchart indicating a procedure of the process at the time of the switching to the CNG operation according to the first embodiment. The flowchart shown in FIG. 6 is repeatedly executed by the ECU 50 in a predetermined cycle.

First, the ECU 50 determines whether or not the liquid fuel operation is in execution (step S201). When the ECU 50 determines that the liquid fuel operation is in execution (step S201; Yes), it determines whether or not the switching to the CNG operation is requested (step S202). When the ECU 50 determines that the switching to the CNG operation is requested (step S202; Yes), it executes the process at step S203 to step S205.

On the other hand, when the ECU 50 determines that the liquid fuel operation is not in execution (step S201; No), or when it determines that the switching to the CNG operation is not requested (step S202; No), it ends the process of the flowchart. Concretely, when the ECU 50 determines that the liquid fuel operation is not in execution (step S201; No), i.e., in case of the CNG operation, it continues to perform the CNG operation. When the switching to the CNG operation is not requested (step S202; No), the ECU 50 continues to perform the liquid fuel operation.

At step S203, the ECU 50 determines whether or not the catalyst temperature T is equal to or higher than the threshold T1 (step S203). When the ECU 50 determines that the catalyst temperature T is equal to or higher than the threshold T1 (step S203; Yes), it executes the starting of the operation by use of CNG (step S204). In this case, by starting the operation by use of CNG, the ECU 50 can reduce the $CH_4$ density and the $H_2O$ density after passing through the front catalyst 3 while purifying NOx in the rear catalyst 4 by means of $H_2$ generated in the front catalyst 3. As a result, the ECU 50 can achieve low emission.

On the other hand, when the ECU 50 determines that the catalyst temperature T does not exceed the threshold T1 (step S203; No), it inhibits the switching to the CNG operation and warms up the front catalyst 3 (step S205). Then, the ECU 50 continues to execute the process at step S205 until the catalyst temperature T becomes equal to or higher than the threshold T1. Thereby, the ECU 50 can also suppress the deterioration of the emission due to the residual $CH_4$ while suppressing damage of sensors due to the condensation of water vapor.

[Second Embodiment]

Summarily, in addition to the configuration of the exhaust device 100 for an internal combustion engine according to the first embodiment, the exhaust device 100 for an internal combustion engine according to the second embodiment has an A/F sensor for detecting an air fuel ratio in the exhaust gas, the A/F sensor being provided on the downstream of the front catalyst 3. In such a configuration, the exhaust device 100 for an internal combustion engine suppresses the damage of the A/F sensor due to water poured over the sensor. A description of a schematic configuration according to the second embodiment will be given before a description of the control method thereof will be given.

(Schematic Configuration)

Figure 7:
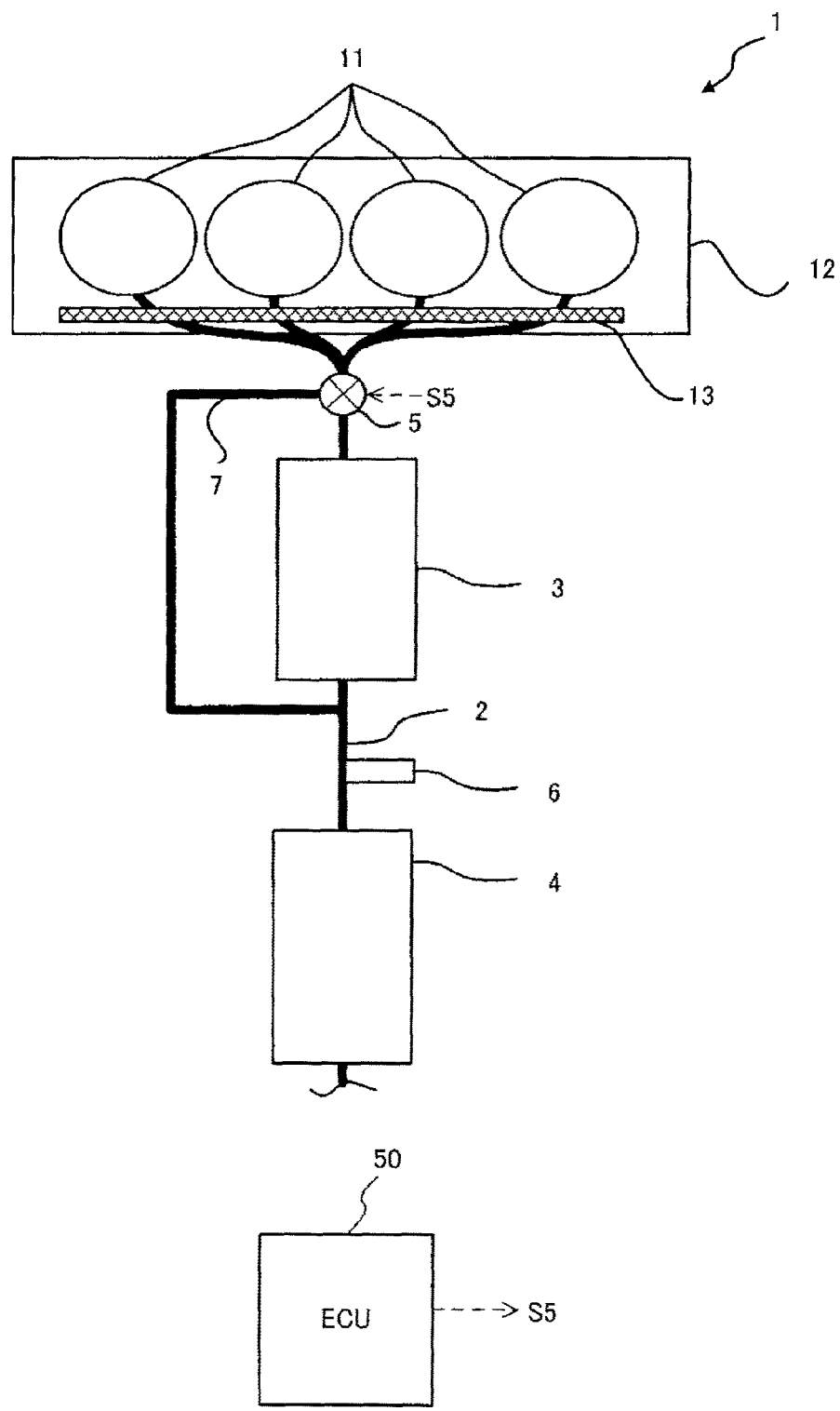
FIG. 7 is an example of a schematic configuration of an exhaust device for an internal combustion engine according to the second embodiment.

FIG. 7 is one example of the schematic configuration of the exhaust device 100 for an internal combustion engine according to the second embodiment. The exhaust device 100 for an internal combustion engine mainly includes the engine 1, the exhaust passage 2, the front catalyst 3, the rear catalyst 4, a switching valve 5, an A/F sensor 6, a bypass passage 7 and the ECU 50. Hereinafter, the explanation of the elements also shown in FIG. 1 will accordingly be omitted.

As shown in FIG. 7, the exhaust device 100 for an internal combustion engine has the bypass passage 7 communicating with the exhaust passage 2 at the upstream side of the front catalyst 3 and with the exhaust passage 2 at the downstream side of the front catalyst 3 and the upstream side of the A/F sensor 6. Furthermore, at the junction of the exhaust passage 2 on the upstream side of the front catalyst 3 and the bypass passage 7, there is provided the switching valve 5 for controlling the flow of the exhaust gas. Based on the control signal S5 supplied from the ECU 50, the switching valve 5 supplies the exhaust gas to either the bypass passage 7 or the exhaust passage 2 having the front catalyst 3 thereon.

On the exhaust passage 2 at the downstream side of the bypass passage 7 and the upstream side of the rear catalyst 4, there is provided the A/F sensor 6 for detecting the air fuel ratio in the exhaust gas. Namely, the exhaust device 100 for an internal combustion engine has the A/F sensor 6 on the exhaust passage 2 at the downstream side of the front catalyst 3.

(Control Method)

Next, a description will be given of the control executed by the ECU 50 in the second embodiment. For the purpose of the reduction of the emission, the ECU 50 starts the operation by use of CNG having a high H/C ratio. In this case, at the time of the CNG operation, the ECU 50 generates the steam reforming reaction according to the reaction formula (1) in the front catalyst 3 thereby to reduce the amount of water poured over the A/F sensor 6. The description thereof will be given with reference to FIGS. 8A, 8B and 9.

Figure 8A:
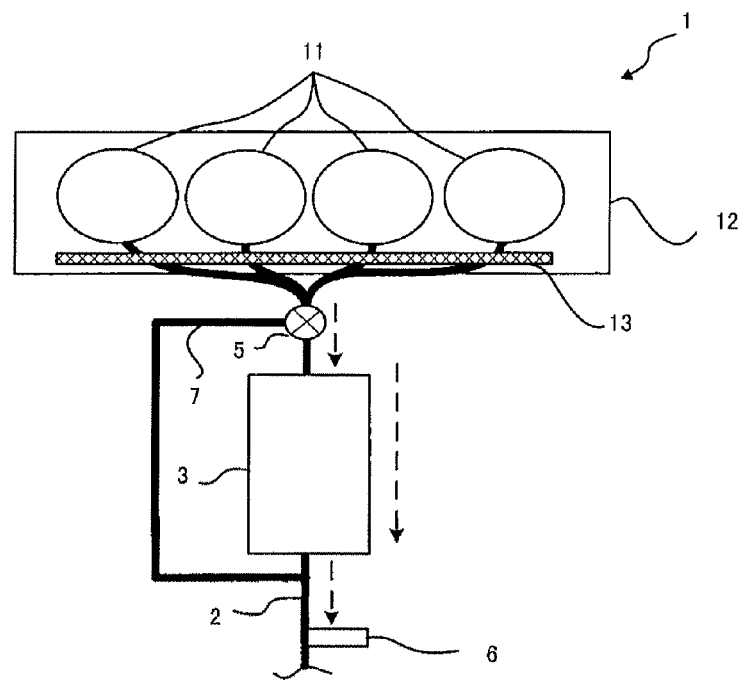
FIGS. 8A and 8B illustrate flows of exhaust gas in the exhaust device for an internal combustion engine according to the second embodiment.

FIG. 8A shows a state of the exhaust device 100 for an internal combustion engine at the time of the CNG operation. Each of the dashed arrows shown in FIG. 8A indicates the flow of the exhaust gas. As shown in FIG. 8A, at the time of the CNG operation, the ECU 50 controls the switching valve 5 so that the exhaust gas passes through the front catalyst 3. Thereby, the ECU 50 accelerates the steam reforming reaction according to the reaction formula (1) in the front catalyst 3 and reduces the $H_2O$ density in the exhaust gas. Thus, the exhaust device 100 for an internal combustion engine can reduce the $H_2O$ density in the exhaust gas at the time of passing through the A/F sensor 6 and can reduce the amount of water poured over the A/F sensor 6.

Figure 8B:
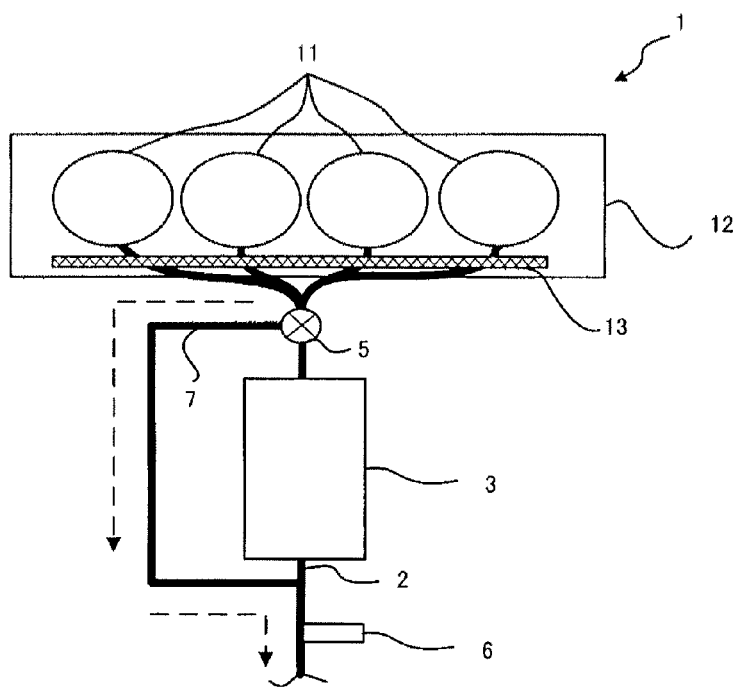

FIG. 8B shows a state of the exhaust device 100 for an internal combustion engine at the time of the liquid fuel operation. Each of the dashed arrows shown in FIG. 8B indicates the flow of the exhaust gas. As shown in FIG. 8B, the ECU 50 controls the switching valve 5 so that the exhaust gas passes through the bypass passage 7. Namely, in this case, the ECU 50 does not supply the exhaust gas to the front catalyst 3 at the time of the liquid fuel operation at which the condensed water generation is smaller than the condensed water generation at the CNG operation. Thereby, the ECU 50 uses the front catalyst 3 only at the time of the CNG operation so that the deterioration of the front catalyst 3 is suppressed.

Figure 9:
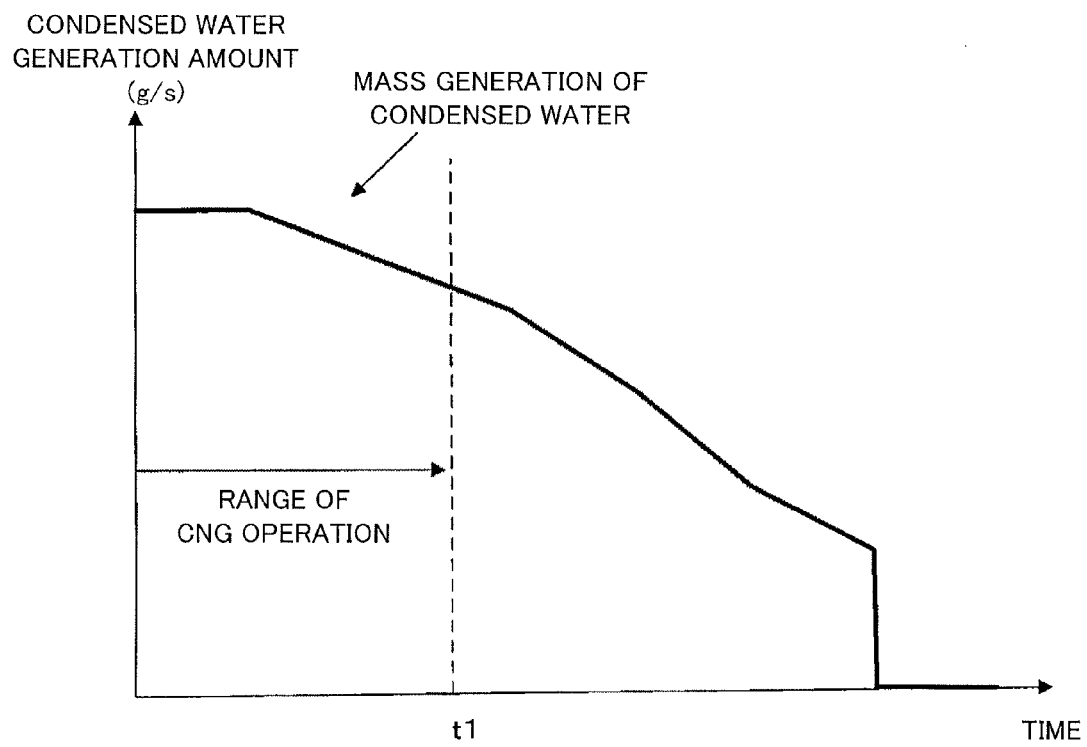
FIG. 9 is a graph indicating the time variation of the condensed water generation after the starting of the engine.

With reference to FIG. 9, the detailed description will be given of the relationship between the range of the CNG operation and the condensed water generation. FIG. 9 is a graph indicating the time variation of the condensed water generation after the starting of the engine 1. As shown in FIG. 9, the condensed water generation has the maximum value at the starting of the engine 1 and gradually decreases thereafter.

First, in terms of lowering the emission, the ECU 50 performs the CNG operation until the time "t1" after the starting of the engine 1. In this case, the ECU 50 controls the switching valve 5 so that the exhaust gas is supplied to the front catalyst 3. Thereby, in a predetermined period just after the starting of the engine 1, when the amount of the condensation of water vapor is large, the ECU 50 can generate the steam reforming reaction according to the reaction formula (1) in the front catalyst 3 thereby to reduce the amount of water poured over the A/F sensor 6.

[Third Embodiment]

In the thirst embodiment, in addition to or instead of the control according to the first or the second embodiment, at the time of the CNG operation, the ECU 50 additionally supplies fuel in which a ratio (hereinafter referred to as "$H_2O/CH_4$ density ratio") of the $H_2O$ density to the $CH_4$ density contained in the exhaust gas after the combustion is higher than the ratio of CNG. Thereby, the ECU 50 increases water vapor in the exhaust gas before passing through the front catalyst 3 and accelerates the reaction according to the reaction formula (1).

The detailed description thereof will be given below. First, the configuration of the exhaust device 100 for an internal combustion engine according to the third embodiment will be described. In addition to the configuration according to the first or the second embodiment, the exhaust device 100 for an internal combustion engine according to the third embodiment has fuel (hereinafter referred to as "high steam fuel") having a higher $H_2O/CH_4$ density ratio in the exhaust gas compared to CNG, the fuel being additionally supplied at the time of the CNG operation. Here, examples of the high steam fuel are ethanol and mixed fuel thereof. For example, the exhaust device 100 for an internal combustion engine may store the high steam fuel in addition to CNG and the liquid fuel, which are stored as fuel for driving the engine 1 in the first and second embodiments. In another example, the exhaust device 100 for an internal combustion engine may have the high steam fuel as the liquid fuel.

Next, the control executed by the ECU 50 in the third embodiment will be described. At the time of the CNG operation, the ECU 50 additionally supplies the high steam fuel to each cylinder 11. Thereby, the ECU 50 can increase the $H_2O$ density supplied from the engine 1 to the front catalyst 3 to accelerate the reaction according to the reaction formula (1). Thus, the ECU 50 reduces the $CH_4$ density in the exhaust gas after passing through the front catalyst 3 thereby to achieve the low emission.

Preferably, the ECU 50 may set the threshold T1 to a smaller value than the threshold T1 of the first embodiment. Concretely, the ECU 50 may set the threshold T1 considering not only the $CH_4$ density and the $H_2O$ density before passing through the front catalyst 3 but also the supply amount of the high steam fuel. For example, the ECU 50 stores a map indicating each threshold T1 with respect to possible combinations of the $CH_4$ density, the $H_2O$ density and the supply amount of the high steam fuel in its memory in advance, and it determines the threshold T1 with reference to the map. Thereby, the ECU 50 can reduce the emission while reducing the duration of inhibiting the CNG operation.

BRIEF DESCRIPTION OF THE REFERENCE NUMBER

1 Engine
2 Exhaust passage
3 Front catalyst
4 Rear catalyst
5 Switching valve
6 A/F sensor
7 Bypass passage
11 Cylinder
12 Cylinder head
13 Water jacket
50 ECU
100 Exhaust device for an internal combustion engine

The invention claimed is:

1. An exhaust device for an internal combustion engine, comprising:
   an engine which can be driven by switching multiple kinds of fuel including CNG;
   an exhaust passage communicating with the engine;
   a reforming catalyst provided on the exhaust passage, the reforming catalyst generating a reducing agent by reforming $CH_4$;
   a NOx purification catalyst provided on the exhaust passage at a downstream side of the reforming catalyst, the NOx purification catalyst purifying NOx by means of the reducing agent; and
   an electronic control unit configured to control a fuel injection valve to supply the CNG to the engine provided that the reforming catalyst has a temperature equal to or higher than a predetermined value.

2. The exhaust device for an internal combustion engine according to claim 1,
   wherein the reforming catalyst generates the reducing agent by reforming $CH_4$ and $H_2O$, and
   the predetermined value is determined based on $CH_4$ density and $H_2O$ density of gas discharged from the engine.

3. The exhaust device for an internal combustion engine according to claim 1,
   wherein in case of supplying CNG to the engine, the electronic control unit is configured to control the fuel injection valve to additionally supply the engine with fuel having a ratio of $H_2O$ density to $CH_4$ density contained in exhaust gas that is higher than a ratio of $H_2O$ density to $CH_4$ density contained in the CNG, and lets the engine combust the fuel.

4. The exhaust device for an internal combustion engine according to claim 1, further comprising an air fuel ratio sensor,
   wherein the reforming catalyst generates the reforming agent by reforming $CH_4$ and $H_2O$, and
   the air fuel ratio sensor is provided on the exhaust passage at the downstream side of the reforming catalyst.

* * * * *